Patented Sept. 13, 1932                                    1,877,057

UNITED STATES PATENT OFFICE

HEINZ SCHEYER, OF FRANKFORT-ON-THE-MAIN, GERMANY, ASSIGNOR TO GENERAL ANILINE WORKS, INC., OF NEW YORK, N. Y., A CORPORATION OF DELAWARE

PROCESS FOR MANUFACTURING MONOHALOGENATED NAPHTHOSTYRIL COMPOUNDS

No Drawing. Application filed January 5, 1928, Serial No. 244,775, and in Germany January 12, 1927.

The present invention relates to a new process for manufacturing monohalogenated naphthostyril compounds and to new compounds obtainable thereby.

According to Eckstrand (Journ. f. prakt. Chemie, Vol. 38, page 139 ff.) by acting with chlorine or bromine on naphthostyril dihalogenated substitution products are obtained containing both halogen atoms in the naphthalene nucleus.

Now I have found that by treating a naphthostyril compound of the formula:

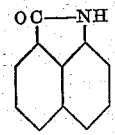

with a salt of hypochlorous or hypobromous acid N-halogenated hitherto unknown derivatives of the formula:

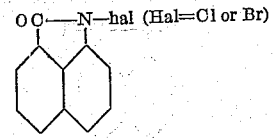

are obtainable, which can easily be converted into such naphthostyril compounds, as are monohalogenated in the nucleus and correspond probably to the formula:

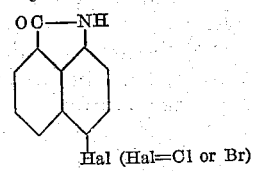

In all of the aforesaid formulas the naphthalene nucleus may contain further substituents.

The molecular rearrangement of the N-halogenated derivatives into the nuclear substitution products may be effected either by treating them with an acid condensing agent such as concentrated sulfuric acid glacial acetic acid, zinc chloride or by heating them as such or advantageously with the addition of a suitable diluent.

The monohalogenated naphthostyril compounds, which Eckstrand (Journ. f. prakt. Chemie (2) Vol. 38, page 172 ff.) could prepare only in a complicated manner, can be manufactured according to my new process with an excellent yield in a very pure state. They are important intermediates for the production of dyestuffs and of pharmaceutical products.

In order to further illustrate my invention the following examples are given, the parts being by weight and all temperatures in Centrigrade degrees. But I wish it to be understood that I am not limited to the particular conditions nor to the specific products mentioned therein.

Example 1

10 parts of naphthostyril (obtainable for instance according to U. S. Patent No. 1,646,290) are suspended in 400 parts of a sodium hypochlorite solution containing 7% of available chlorine and the mixture is then heated to boiling for some time. A turbulent reaction takes place and the N-chloronaphthostyril separates as a granular yellow precipitate. The new compound of the formula:

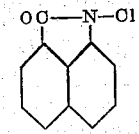

is easily soluble in the usual organic solvents. When recrystallized from alcohol, it forms compact yellow crystals, melting at 132°. The concentration of the chlorinating solution used may be varied within large limits. Instead of a sodium hypochlorite solution also other hypochlorites may be used for the process, such as a solution of chloride of lime.

10 parts of N-chloronaphthostyril, thus obtained, are dissolved in about 180 parts of sulfuric acid 96° Bé. and the solution is allowed to stand for some hours at ordinary temperature. Then it is poured on ice and the chloronaphthostyril separating in yellowish flakes is isolated in the usual manner. When recrystallized from trichlorobenzene, it is obtained in the form of yellow needles, melting at about 270°, as stated by Eckstrand (l. c.).

It corresponds probably to the formula:

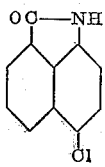

In order to convert the N-chloronaphthostyril one may proceed also as follows:

10 parts of N-chloronaphthostyril are dissolved in about 50 parts of monochlorobenzene and the solution is heated to boiling under reflux. After a short time the formed chloronaphthostyril begins to separate as yellow needles, which soon fill up the whole liquid. They are isolated in the usual manner. The chloronaphthostyril, thus obtained, is identical with the product described above.

Instead of monochlorobenzene, for example, toluene, trichlorobenzene or particularly glacial acetic acid may also be used as diluents, for example. In the latter case the addition of a small amount of hydrochloric acid accelerates the reaction. When heating the N-chloronaphthostyril as such to about 140°, the same reaction of chlorine transposition takes place. In an analogous manner the N-bromonaphthostyril may be produced and converted into the corresponding 4-bromonaphthostyril.

*Example 2*

10 parts of 5-ethoxynaphthostyril of the formula:

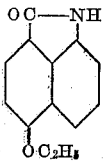

(obtainable by treating 8-cyannaphthalene-1.5-disulfonic acid with alkaline acting agents and ethylating the formed 5-hydroxynaphthostyril) are suspended in about 400 parts of a sodium hypochlorite solution containing 7% of available chlorine and the mixture is heated to boiling, until the reaction product, which separates at first on the surface of the liquid as an oily mass, solidifies to a granular precipitate. The new N-chloro-5-ethoxynaphthostyril, thus obtained, corresponds probably to the formula:

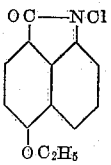

it is isolated in the usual manner. The raw product melts at 115–120°; when recrystallized from alcohol, it forms almost colorless needles melting at about 117°.

10 parts of this N-chloro-5-ethoxynaphthostyril are boiled for some hours under reflux with 40 parts of glacial acetic acid. The 4-chloro-5-ethoxynaphthostyril, thus formed, corresponds probably to the formula:

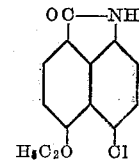

It separates partly already from the hot solution in the form of as feebly yellowish needles. After cooling down the liquor, the precipitate is filtered off. When recrystallized from glacial acetic acid, the new compound melts at about 246°.

The same reaction of chlorine transposition takes place, when heating the N-chloro-5-ethoxynaphthostyril above its melting point to about 160°.

I claim:

1. A step in the preparation of nuclear halogenated naphthostyrils which consists in treating a compound of the formula:

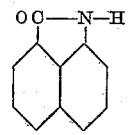

wherein the naphthalene nucleus may contain an alkoxy group, with a salt of the group of acids consisting of hypochlorous and hypobromous acid.

2. A step in the preparation of nuclear halogenated naphthostyrils which consists in treating a compound of the general formula:

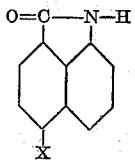

wherein X represents hydrogen or alkoxy, with a salt of the group of acids consisting of hypochlorous and hypobromous acid.

3. A step in the preparation of nuclear halogenated naphthostyrils which consists in treating a compound of the general formula:

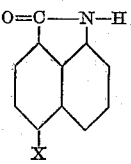

wherein X represents hydrogen or alkoxy, with a sodium-hypochlorite solution containing about 7% of available chlorine.

4. The process which comprises treating a compound of the formula:

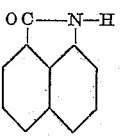

wherein the naphthalene nucleus may contain an alkoxy group, with a salt of the group of acids consisting of hypochlorous and hypobromous acid and heating the N-halogenated compound thus obtained in the presence of an organic diluent.

5. The process which comprises treating a compound of the general formula:

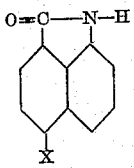

wherein X represents hydrogen or alkoxy, with a salt of the group of acids consisting of hypochlorous and hypobromous acid and heating the N-halogenated compound thus obtained in the presence of an organic diluent.

6. The process which comprises treating a compound of the general formula:

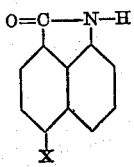

wherein X represents hydrogen or alkoxy, with a salt of the group of acids consisting of hypochlorous and hypobromous acid and heating the N-halogenated compound thus obtained in the presence of an acid organic diluent.

7. As new products N-halogenated naphthostyril compounds of the general formula:

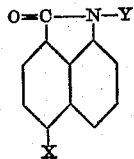

wherein X represents hydrogen or alkoxy and Y represents chlorine or bromine, which products are colorless to yellowish colored crystalline substances having definite melting points and being soluble in the usual organic solvents.

8. As new products N-halogenated naphthostyril compounds of the formula:

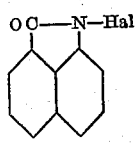

wherein Hal means chlorine or bromine and the naphthalene nucleus may contain an alkoxy group, which products are colorless to yellowish colored crystalline substances, having a definite melting point and being soluble in the usual organic solvents.

9. As new products N-chlorinated naphthostyril compounds of the formula:

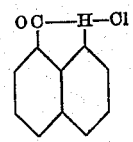

wherein the naphthalene nucleus may contain an alkoxy group, which products are colorless to yellowish colored crystalline substances, having a definite melting point and being soluble in the usual organic solvents.

In testimony whereof, I affix my signature.

HEINZ SCHEYER.